(12) United States Patent
Schnurr et al.

(10) Patent No.: US 7,520,834 B2
(45) Date of Patent: Apr. 21, 2009

(54) MULTIPLE REAR DRIVE AXLES WITH COMMON GEARING

(75) Inventors: Richard Duane Schnurr, Williamsport, MD (US); Brian Eugene Gordon, Shady Grove, PA (US); Mark Allan Winders, Hagerstown, MD (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 11/825,432

(22) Filed: Jul. 6, 2007

(65) Prior Publication Data

US 2008/0015075 A1    Jan. 17, 2008

Related U.S. Application Data

(63) Continuation of application No. PCT/US2005/000331, filed on Jan. 7, 2005.

(51) Int. Cl.
*F16H 48/06* (2006.01)
*B62D 61/10* (2006.01)

(52) U.S. Cl. .................... 475/253; 475/246; 475/251; 180/24.01; 180/24.11

(58) Field of Classification Search ................. 475/231, 475/246, 251, 253; 180/22, 24.01, 24.11
See application file for complete search history.

(56) References Cited

U.S. PATENT DOCUMENTS

| 2,120,594 | A | * | 6/1938 | Alden | 180/24.11 |
| 3,006,426 | A | * | 10/1961 | Popiel | 180/24.04 |
| 3,887,037 | A | * | 6/1975 | Haluda et al. | 184/6.12 |
| 4,887,487 | A | * | 12/1989 | Mayfield | 475/74 |
| 5,127,887 | A | * | 7/1992 | Nuttall | 475/2 |
| 5,267,489 | A | * | 12/1993 | Ziech | 74/606 R |
| 5,295,925 | A | * | 3/1994 | Hirabayashi | 475/331 |

FOREIGN PATENT DOCUMENTS

GB    2029521 A  *  3/1980

* cited by examiner

*Primary Examiner*—Tisha D Lewis
(74) *Attorney, Agent, or Firm*—Martin Farrell

(57) ABSTRACT

A multiple rear drive axle system for a vehicle includes a first axle coupled with a drive shaft from a transmission of the vehicle. The first axle includes a first cantilevered input pinion mechanically coupled with the drive shaft and with a first driven gear. The system also includes an output shaft mechanically coupled with the drive shaft. A second axle has a second cantilevered input pinion mechanically coupled with the output shaft of the first axle system and with a second driven gear. The first and second input pinions are common, that is, are substantially identical pinions. The first and second driven gears are also common, that is, are substantially identical gears.

7 Claims, 4 Drawing Sheets

MULTIPLE REAR DRIVE AXLES WITH COMMON GEARING

BACKGROUND OF THE INVENTION

1. Field of the Invention

The present invention is generally directed to wheel drive systems for a motor vehicle. More particularly, the present invention is related a multiple rear drive axle that utilizes axle carriers with common primary gearing for all axle carriers.

2. Description of the Related Art

Tandem rear driving axles are known.

U.S. Pat. No. 2,120,594 is directed to an automotive double reduction driving axle including bevel gearing of a first reduction and spiral gearing for a second reduction.

U.S. Pat. No. 1,845,318 is directed to double reduction tandem rear drive axle with a bevel gear reduction ahead of a spur gear reduction. Bevel gear and spur pinion are formed integral on a common shaft. The bevel gear and spur pinion are disposed above the final gear. A differential mechanism delivers power from final gear to the axle.

U.S. Pat. No. 1,906,613 describes a double reduction tandem rear drive axle with a bevel gear reduction ahead of a spur gear reduction. Bevel gear and spur pinion are formed integral on a common shaft. The bevel gear and spur pinion are disposed above the final gear. A differential mechanism delivers power from final gear to each driving axle. A two piece input pinion is used and supported in a straddle mounted configuration.

U.S. Pat. No. 5,267,489 describes an automotive driving axle that includes a drive shaft, linked to a counter shaft via gearing. Sharing the counter shaft is a drive pinion which links at 90 degrees with axle ring gear to drive the vehicle wheels.

U.S. Pat. No. 5,370,018 is directed to an internally vented interaxle differential assembly. This patent discloses an axle gear configuration having a spur gear set connecting the drive shaft to a counter shaft, which in turn uses bevel gearing to drive the vehicle wheels.

U.S. Published Patent Application No. 2003/0040394 is directed to a four wheel drive type power train assembly.

There is a need for new and improved multiple rear drive axles that produce a maximum number of different multiple drive axle ratios with a minimum number of gears.

SUMMARY OF THE INVENTION

In accordance with an embodiment of the present invention, a multiple axle drive system is provided that produces a maximum number of different multiple drive axle ratios with a minimum number of gears. According to an embodiment of the present invention, common gearing is provided between each axle.

According to an embodiment of the present invention, a multiple rear drive axle system for a vehicle is provided. The system includes a first axle coupled with a drive shaft from a transmission of the vehicle. The first axle includes a first cantilevered input pinion mechanically coupled with the drive shaft and with a first driven gear. The first driven gear is coupled with a power delivery system (e.g., single, multiple reduction) to deliver power to wheels of the vehicle. The first axle also includes an output shaft mechanically coupled with the drive shaft. The system also includes at least a second axle having a second cantilevered input pinion mechanically coupled with the output shaft of the first axle and with a second driven gear. The second driven gear is coupled with a second power delivery system to deliver power to heels of the vehicle. The first and second input pinions are common, i.e., are substantially identical pinions. The first and second driven gears are also common, i.e., are substantially identical gears.

According to another embodiment of the present invention, a multiple rear drive axle system for a vehicle is provided. The system includes a first axle having a first common input means for delivering power from a drive shaft from a transmission of the vehicle to a first common driven gear means for delivering power to a first wheel power delivery means for delivery power to wheels of the vehicle. The first axle further comprises output means for delivering power from the drive shaft to an input of a second axle. The second axle has a second common input means for delivering power from the output means of the first axle to a second common driven gear means for delivering power to a second wheel power delivery means for delivery power to wheels of the vehicle.

Further applications and advantages of various embodiment of the present invention are discussed below with reference to the drawing figures.

DETAILED DESCRIPTION OF THE PREFERRED EMBODIMENTS

Figure 1:
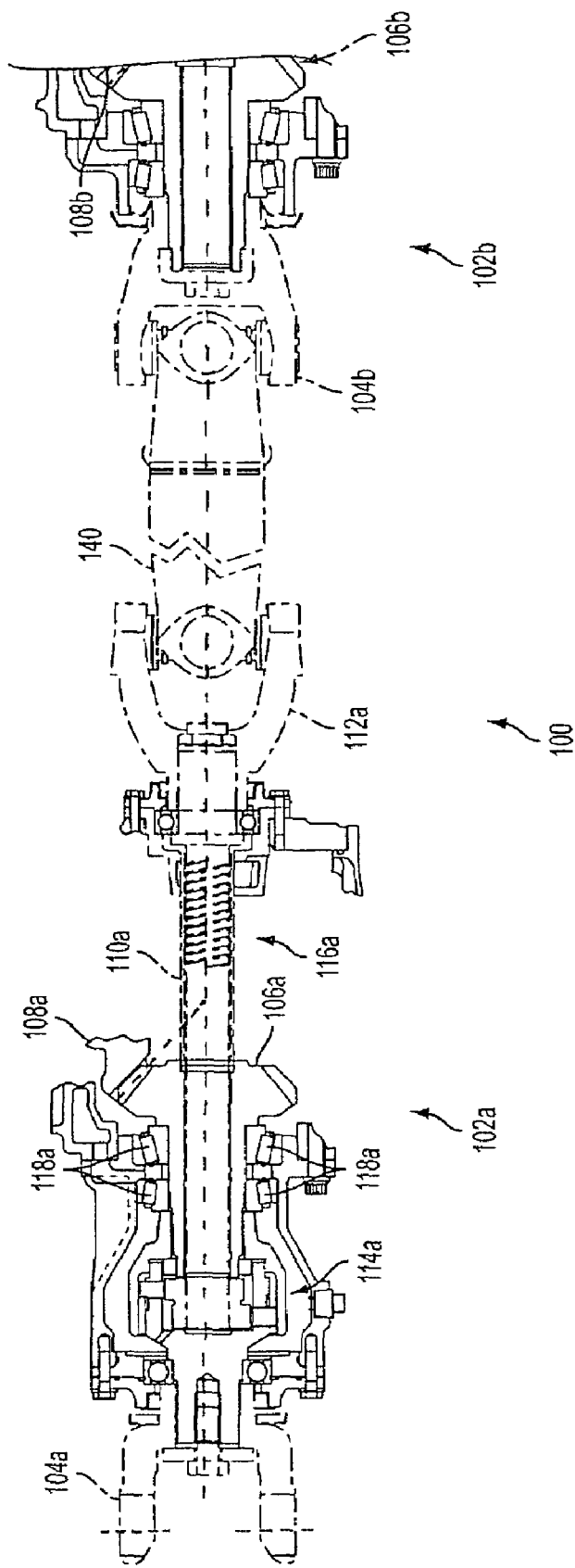
FIG. 1 is a schematic of a multiple rear axle drive system according to an embodiment of the present invention.

FIG. 1 is a schematic of a multiple rear drive axle system with common gearing according to an embodiment of the present invention. Drive system 100 includes a plurality of axles. For simplicity, a forward driving axle 102a and a rear driving axle 103 are shown, but there is no limit to the number of axles in system 100. The forward driving axle 102a includes a common one piece cantilevered input gear 106a coupled with an input drive shaft (not shown) by a coupling 104a. For example, in a truck, the drive shaft coming out of the transmission could connect to coupling 104a, which may be e.g., a universal coupling. The input gear 106a (pinion) drives a common driven gear 108a coupled to a power delivery system (not shown) which powers to the wheels of the vehicle. Such systems for delivering power to the wheels are well known in art and could include a gear driving system, differentials, multiple gear reduction drive system, chains, belts and solid connectors.

An output shaft 110a connects to another output coupling 112a, which in turn, is connected to the next axle 103 by an intermediate shaft 140 to the coupling 104b. Forward driving axle system 102a can include a gear differential 114a which can be lubricated by an oil pump, such as an Archimedean pump 116a on the shaft 110a. The gear differential 114a is provided to divide power from the drive shaft between the input pinion 016a and the output shaft 110a. One will understand that the shaft 110a is preferably a through-shaft which couples with the differential 114a directly (and not the pinion). One skilled in the art will understand that a differential may not be necessary for each axle, depending upon vehicle application. However, preferably, at least one gear differential 114 is provided for each axle (102n) except the last axle 103. A third intermediate axle would be substantially identical to the first axle 102a. Therefore, as additional intermediate axles are added, each intermediate axle (102b... 102n) will be substantially identical to the first axle 102a. Only the last axle 103 would normally be different.

Common input gear 106a is cantilevered from a bearing system 118a, which are preferable roller bearings, and is preferably a one-piece pinion. Common input gear 106a should be the same gear (pinion) as the input gear used in each additional axle (i.e., 106b, 106c... 106n). Similarly, the common driven gear 108a should be the same gear as the driven gear used in each additional axle (i.e., 108b, 108c... 108n). Thus, a common gearing system exists between each axle 102a, 102b... 102n, 103. Note, the last axle in the multiple-axle system is designated by "103" only because it preferably does not include unnecessary components such as an output shaft or differential. However, the present invention is not intended to be limited as such, and the last axle could be substantially identically to all other axles in the system, although it is recognized as somewhat impractical.

Figure 2:
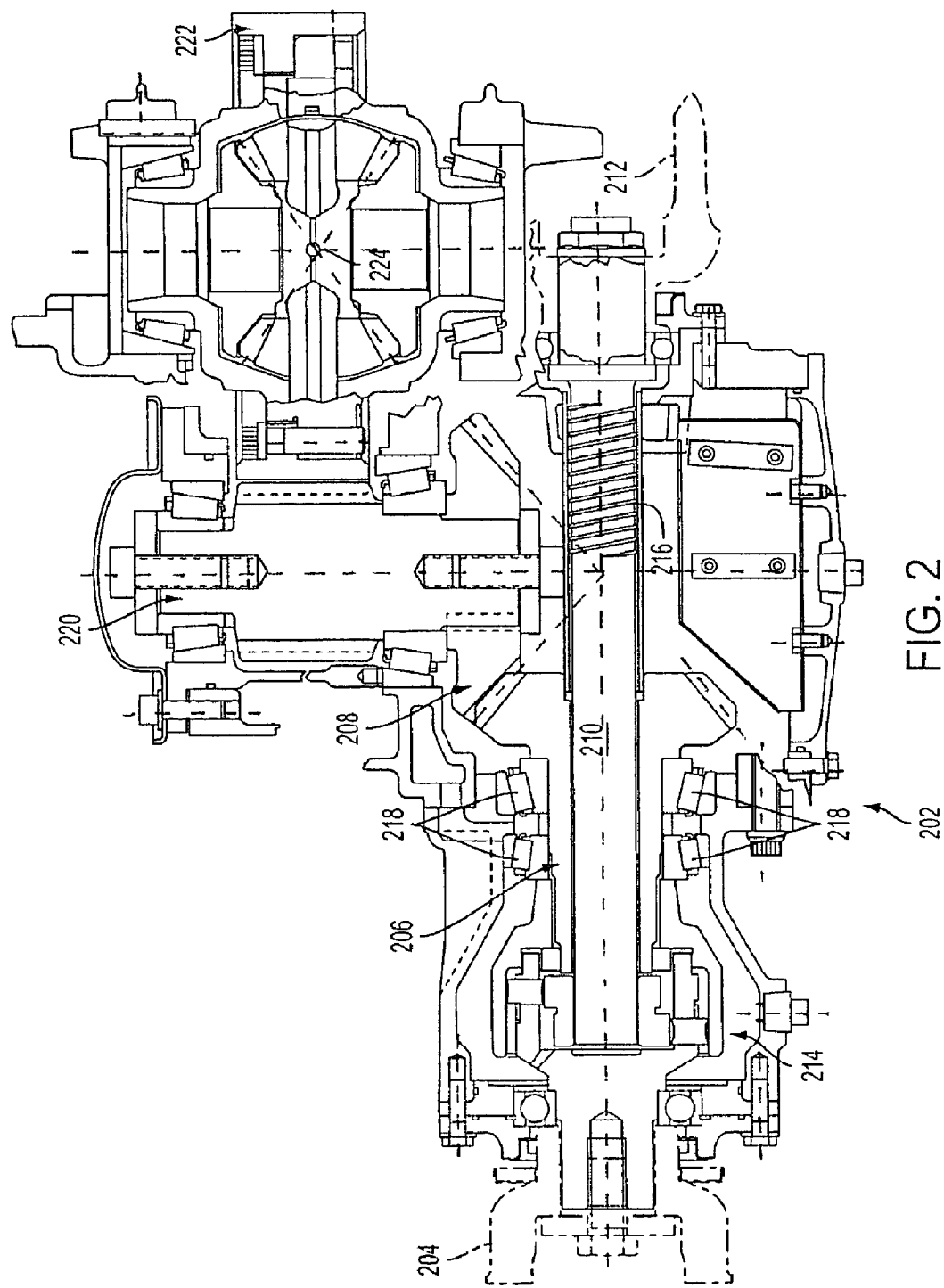
FIG. 2 is a schematic of a forward portion of a multiple rear axle drive system according to an embodiment of the present invention.
Figure 3:
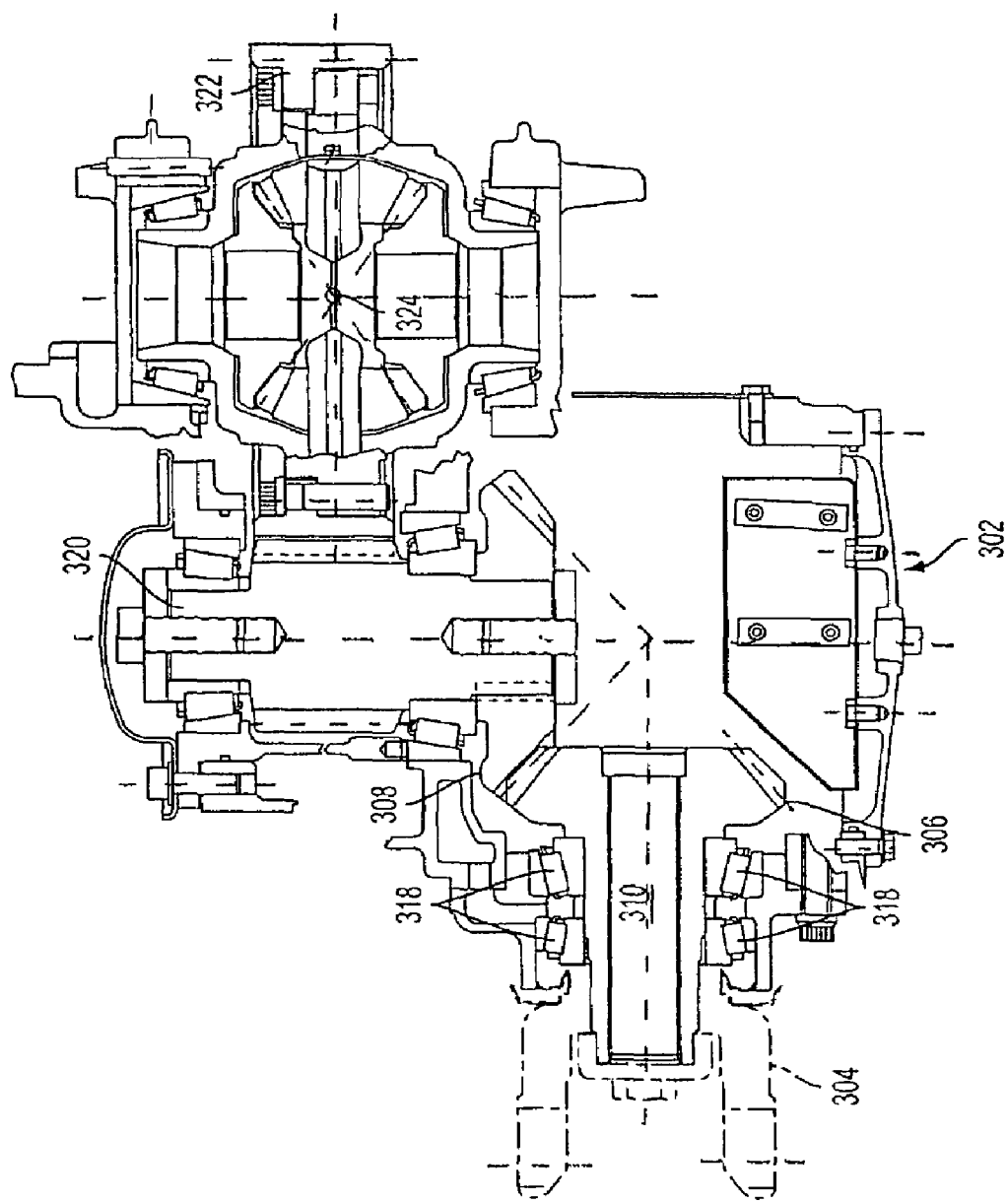
FIG. 3 is a schematic of a rear portion of a multiple rear axle drive system according to an embodiment of the present invention.

FIGS. 2 and 3 show the forward rear and rear rear drive axles respectively of a dual reduction tandem rear dive axle according to another embodiment of the present invention. Similar to the system 100 of FIG. 1, a universal joint 204 is coupled with a drive shaft (not shown) from the vehicle transmission (not shown). A first ball bearing system 218 supports the shaft 210 on which a cantilevered bevel pinion 206, which acts as the input gear to the forward rear axle 202. A bevel gear 208 (common driven gear) is driven by the bevel pinion 206.

The forward rear axle 202 also can include a differential 214 and an Archimedean pump 216. The shaft 210 is connected to a universal coupling 212. The universal coupling 212 is connected to the rear rear axle (shown in FIG. 3).

A helical double-reduction system is shown in FIGS. 2-3 for delivering power to the vehicle wheels, but the present invention is not limited to this system. Drive bevel gear 208 is coupled with a helical pinion 220 which drives a helical gear 222, which delivers power to the wheels. The helical gear 222 includes a gear differential 224. This dual reduction system provides for improved drive line angles and other advantages.

FIG. 3 shows the rear rear axle 302, which is coupled with the forward rear axle 202 by a universal joint or the like with coupling 304. All the components of rear rear axle 302 are the same as in the forward rear axle 202 except that the gear differential 214 and its accessories are not required in the rear rear axle system. Note that input pinions 206 and 306 are preferably the same make and model pinions (i.e. identical parts), and that driven gears 208 and 308 are also the same make and model gears, creating a common gearing system for both axles.

Figure 4:
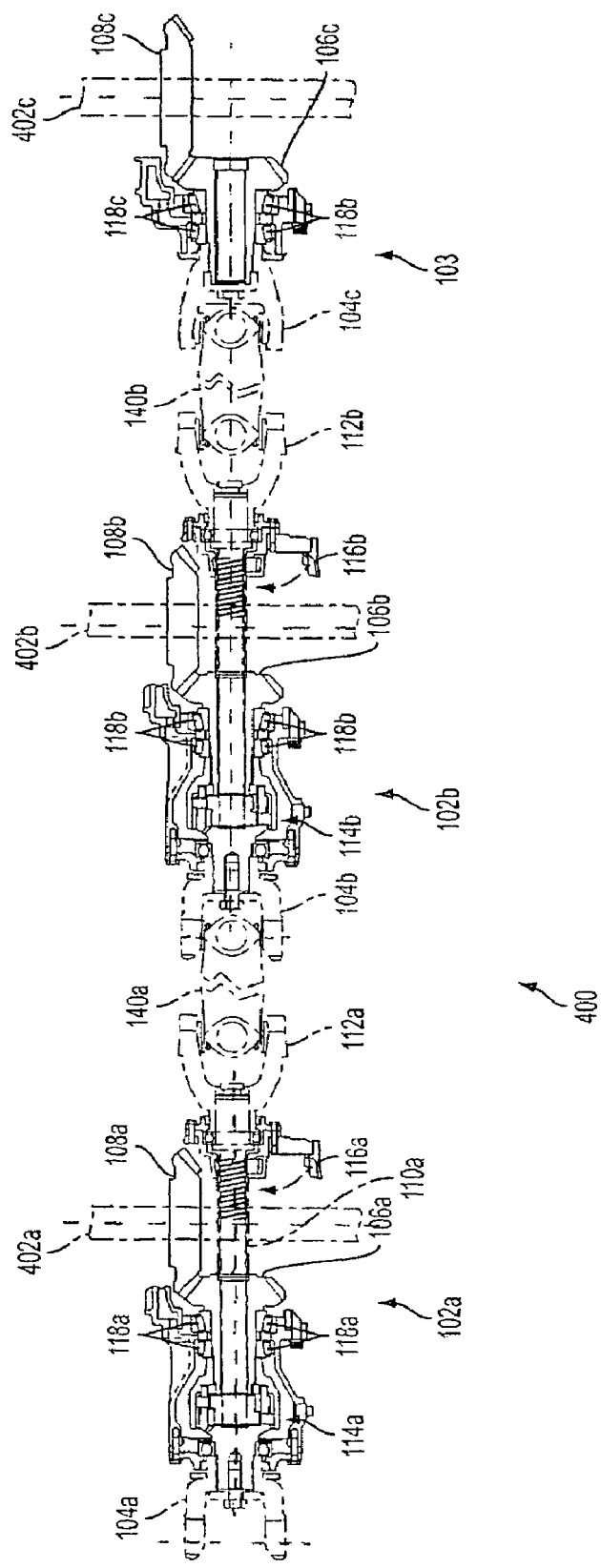
FIG. 4 is a schematic of a multiple rear axle system having three axles according to an embodiment of the present invention.

FIG. 4 shows a triaxle system according to an embodiment of the present invention. The triaxle system 400 includes three (3) axles, a first axle 102a, a second axle 102b, and third axle 103. Each of the three (3) axles is substantially similar, however, the last axle 103 does not require an output shaft 110 or output coupling 112, and as shown, the last axle 103 also does not include a differential 114. One skilled in the art will understand, however, that the last axle 103 could be configured the same as any of the other axles 102a to 102b(n), but since the last axle 103 does not need any output to drive other rear axles, these components are unnecessary.

Each of the axles 102a, 102b, 103 share common gearing. That is, input pinions 106a to 106c are substantially identical, and drive gears 108a to 108c are also substantially identical.

Each axle 102a, 102b and 103 is shown as having a direct coupling with the vehicle wheels 402a to 402c. One skilled in the art would readily understand that any power delivery system could be incorporated into the axles for driving the vehicle wheels. For example, a single reduction, double reduction, or a differential coupling, for example, could be employed.

All other components of system 400 are shown as identical to those in FIG. 1, and therefore, will not be further described here.

The systems described above provide numerous advantages. For example, by cantilevering the input pinions, fewer bearings are required and it is easier to provide for a common input gear. Further, it provides for common input pinions. Thus, a more efficient, yet less expensive system is achievable.

Thus, a number of preferred embodiments have been fully described above with reference to the drawing figures. Although the invention has been described based upon these preferred embodiments, it would be apparent to those of skilled in the art that certain modifications, variations, and alternative constructions would be apparent, while remaining within the spirit and scope of the invention. For example, one skilled in the art should readily understand that the present invention is applicable to not only to tandem rear drive axles but also to tri-drive and other multiple rear drive axles as well.

We claim:

1. A multiple rear drive axle system for a vehicle, said system comprising:

a first axle having gear differential means coupled to a drive shaft from a transmission of the vehicle, the gear differential means coupled to and dividing output power between a first common input means for delivering power to a first common driven gear means for delivering power to a first wheel power delivery means for delivery power to wheels of the vehicle and output means for delivering power from the drive shaft to an input of another axle; and a second axle having a second common input means for delivering power from the output means of said first axle to a second common driven gear means for delivering power to a second wheel power delivery means for delivery power to wheels of the vehicle;

wherein said first and second input means each comprise substantially identical cantilevered input pinions and said first and second driven gear means each comprise substantially identical driven gears.

2. The multiple rear drive axle system as recited by claim 1, wherein the second axle includes second gear differential means coupled to the output means of the first axle, the second gear differential means coupled to and dividing output power between the second common input means and second axle output means for delivering power to an input of another axle, and further comprising:

a third axle having a third common input means for delivering power from the output means of said second axle to a third common driven gear means for delivering power to a third wheel power delivery means for delivery power to wheels of the vehicle.

3. The multiple rear drive axle system as recited by claim 2, wherein said first, second and third input means each comprise input pinions that are substantially identical and said first and second driven gear means each comprise driven gears that are substantially identical.

4. The multiple rear drive axle as recited by claim 1, wherein:

said first and second input means comprise input pinions that are cantilevered from a bearing system mounted radially outward of the respective input pinion.

5. The multiple rear drive axle as recited by claim 1, wherein:

said first and second wheel power delivery means each comprise a double reduction gearing system for delivery power to the wheels of the vehicle.

6. The multiple rear drive axle as recited by claim 2, wherein: said third wheel power delivery means comprises a double reduction gearing system for delivery power to the wheels of the vehicle.

7. The multiple rear drive axle as recited by claim 3, wherein:

each input pinion comprises a one-piece pinion.

* * * * *